United States Patent [19]

Townsend

[11] Patent Number: 5,199,921
[45] Date of Patent: Apr. 6, 1993

[54] CHUCK FOR MEAT ENCASING MACHINES

[75] Inventor: Ray T. Townsend, Des Moines, Iowa

[73] Assignee: Townsend Engineering Company, Des Moines, Iowa

[21] Appl. No.: 901,823

[22] Filed: Jun. 22, 1992

[51] Int. Cl.⁵ .............................................. A22C 7/00
[52] U.S. Cl. ........................................ 452/47; 452/30
[58] Field of Search ...................... 452/30, 32, 35, 37, 452/45, 48, 46

[56] References Cited

U.S. PATENT DOCUMENTS

| | | | |
|---|---|---|---|
| 3,115,668 | 12/1963 | Townsend | 452/47 |
| 3,964,128 | 6/1976 | Townsend et al. | 452/47 |
| 3,964,236 | 6/1976 | Smith | 452/34 |
| 5,013,279 | 5/1991 | Southworth | 452/46 |
| 5,092,813 | 3/1992 | Kasai et al. | 452/46 |

Primary Examiner—Willis Little
Attorney, Agent, or Firm—Zarley, McKee, Thomte, Voorhees & Sease

[57] ABSTRACT

A chuck for a meat encasing machine has an elongated body having an inlet end and a discharge end. The body has an elongated hollow bore extending therethrough and an exterior cylindrical surface. A plurality of radially extending flutes are in the bore of the body for purposes of grasping and imparting rotational motion to a filled meat casing. An annular groove extends around the exterior cylindrical surface of the body member. A resilient O-ring is mounted in the groove and slightly projects outwardly from the groove to frictionally engage a socket into which the chuck is inserted.

2 Claims, 1 Drawing Sheet

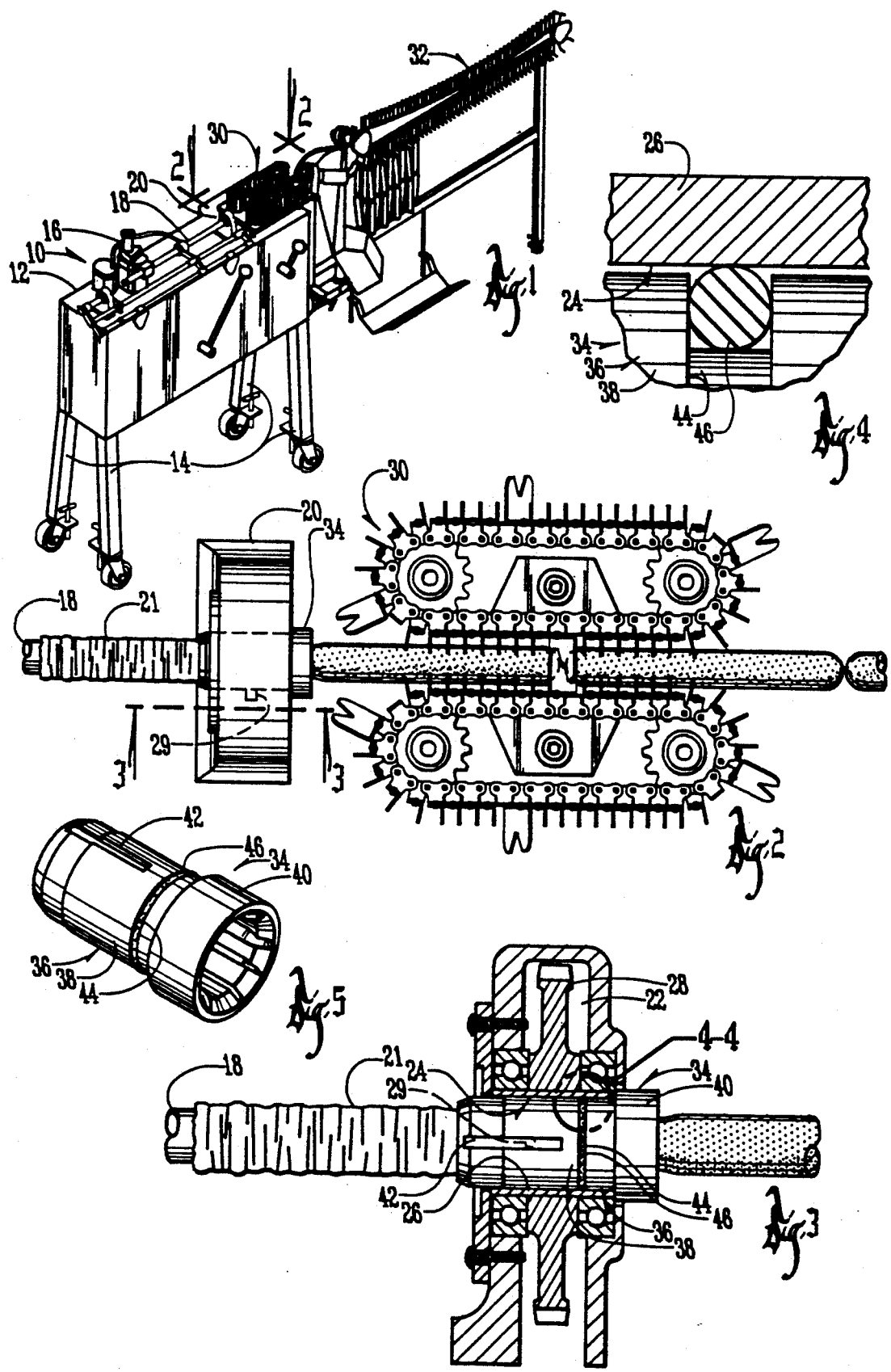

CHUCK FOR MEAT ENCASING MACHINES

BACKGROUND OF THE INVENTION

Meat encasing machines for manufacturing sausages, wieners and the like have long existed in the prior art. Such a machine is shown in U.S. Pat. No. 3,115,688. These machines typically have an elongated stuffing horn upon which is mounted a shirred flexible casing. A hollow cylindrical chuck is mounted on the machine and receives the discharge end of the stuffing horn through which meat emulsion is extruded. The end of the stuffing horn and the shirred casing thereon are inserted into the casing which is rotated by a suitable drive mechanism. A chuck twists the casing as meat emulsion is extruded therein. A linking mechanism downstream from the discharge end of the stuffing horn serves to grasp the filled casing to hold it against rotation. Thus, the opposing forces exerted on the casing by the chuck and the linking mechanism cause the casing to twist at longitudinal increments defined by the distance between the discharge end of the chuck and the point where the filled casing is grasped by the linking mechanism.

Machines of this type commonly encase up to 5,000 pounds of meat emulsion per hour into approximately 30,000 wieners or sausages. The chucks used in the prior art are made of plastic and have flutes therein which enable them to grasp the casing as it is being filled so that the casing can be rotated. These flutes are disposable and may have a useful life of only six to eight hours if the machine is being continuously operated.

The conventional chucks fit into a sleeve within the housing that imparts rotational motion to the chuck. The sleeve is normally of a compatible diameter to snugly receive the outer circumference of the chuck. However, sometimes the tolerances of these two components are such that the chuck is not firmly grasped by the sleeve and some oscillating movement of the chuck results as it is being rapidly rotated by the sleeve. This oscillation results in the casing rupturing as the meat emulsion is being extruded therein.

It is therefore a principal object of this invention to provide a chuck for meat encasing machines which will not experience any oscillation as it is imparting rotational motion to a casing being filled by the machine.

A further object of this invention is to provide a chuck for a meat encasing machine which can be quickly and easily inserted into and removed from the drive sleeve of a meat encasing machine.

A still further object of this invention is to provide a chuck for a meat encasing machine which can be economically manufactured.

These and other objects will be apparent to those skilled in the art.

SUMMARY OF THE INVENTION

A chuck for a meat encasing machine has an elongated body having an inlet end and a discharge end. The body has an elongated hollow bore extending therethrough and an exterior cylindrical surface.

A plurality of radially extending flutes are in the bore of the body for purposes of grasping and imparting rotational motion to a filled meat casing.

An annular groove extends around the exterior cylindrical surface of the body member. A resilient O-ring is mounted in the groove and slightly projects outwardly from the groove to frictionally engage a socket into which the chuck is inserted.

BRIEF DESCRIPTION OF THE DRAWINGS

FIG. 1 is a perspective view of a meat encasing machine in which the chuck of this invention is used;

FIG. 2 is an enlarged scale plan view taken on line 2—2 of FIG. 1;

FIG. 3 is an enlarged scale sectional view taken on line 3—3 of FIG. 2;

FIG. 4 is an enlarged scale sectional view taken on line 4—4 of FIG. 3; and

FIG. 5 is a perspective view of the chuck of this invention.

DESCRIPTION OF THE PREFERRED EMBODIMENT

The conventional machine 10 in FIG. 1 has a frame 12 and supporting legs 14. A meat emulsion pump 16 is mounted on the top of frame 12 and is connected to a conventional elongated stuffing horn 18.

A drive housing 20 is mounted on the top of frame 12 and receives the discharge end of stuffing horn 18. A conventional shirred (telescopically compressed) casing 21 is mounted on stuffing horn 18.

Drive housing 20 has a hollow interior compartment 22 and a hollow bore 24 extending therethrough. A bearing sleeve or socket 26 is mounted within housing 20 and is adapted to be rotatably driven by drive gear 28 which is connected to a source of rotational power (not shown). A drive pin 29 shown in dotted lines in FIGS. 2 and 3 extends inwardly from bearing sleeve 26 to engage and drive the chuck of this invention as will be described hereafter.

A conventional linking mechanism 30 is mounted on the top of frame 12 downstream from the discharge end of stuffing horn 18. Similarly, a conventional conveyor 32 is located downstream of the discharge end of a linking mechanism 30.

All of the components of the machine 10 described heretofore are of conventional construction and do not of themselves comprise the essence of this invention.

The chuck 34 of this invention is comprised of a cylindrical body 36 which has an outer surface 38 and a shoulder 40 mounted adjacent its discharge end. An elongated drive groove 42 is milled or otherwise formed in the outer surface 38 of body 36 as best shown in FIG. 3. The drive pin 29 is adapted to penetrate into the drive groove 42 as will be described hereafter.

An annular groove 44 is milled or otherwise formed in the outer surface 38 or of body 36, and resilient O-ring 46 is frictionally mounted therein. As best shown in FIG. 4, the outer peripheral surface of O-ring 46 extends beyond the plane of outer surface 38 to frictionally engage the interior surface of bearing sleeve 26.

When it is desired to insert the chuck 34 into the bearing sleeve 26, the drive groove 42 is longitudinally aligned with the drive pin 29, and the chuck is then inserted within the bearing sleeve 26 to assume the position best shown in FIG. 3.

The resilient O-ring 46 frictionally engages the interior surface of the bearing sleeve 26 as shown in FIG. 4 and is slightly compressed within annular groove 44 to fixedly hold the sleeve against any oscillation within sleeve 26 in the event that some space does exist between the outer surface 38 of the body 36 of the chuck, and the interior surface of the bearing sleeve 26.

The chuck 34 can be easily removed from sleeve 26 by reversing the foregoing procedure.

It is therefore seen that the improved chuck of this invention will eliminate any oscillation between the chuck and the drive sleeve. Further, the presence of the annular groove 44 and the O-ring 46 will not in any way impair the easy removal from or insertion into the drive sleeve 26. Thus it is seen that this invention will achieve at least all of its stated objectives.

I claim:

1. A chuck for a meat encasing machine, comprising, an elongated body having an inlet end and a discharge end, a hollow bore extending therethrough, and exterior cylindrical surface, a plurality of radially extending flutes in said bore, an annular groove extending around said exterior cylindrical surface, a resilient O-ring in said annular groove and slightly projecting outwardly from said groove to frictionally engage a socket 26 into which said chuck is inserted to prevent oscillation of said chuck with respect to said socket.

2. A chuck for a meat encasing machine, comprising, an elongated body having an inlet end and a discharge end, a hollow bore extending therethrough, and exterior cylindrical surface, a plurality of radially extending flutes in said bore, resilient means on said chuck to frictionally engage a socket into which said chuck is inserted to prevent oscillation of said chuck with respect to said socket.

* * * * *